(12) United States Patent  
Nuechterlein (10) Patent No.: US 9,381,960 B1  
(45) Date of Patent: Jul. 5, 2016

(54) TRACK RECOIL SYSTEM

(71) Applicant: Caterpillar Inc., Peoria, IL (US)

(72) Inventor: Joshua Nuechterlein, Washington, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 14/592,486

(22) Filed: Jan. 8, 2015

(51) Int. Cl.  
*B62D 55/30* (2006.01)  
*B62D 55/18* (2006.01)  
*B62D 55/06* (2006.01)

(52) U.S. Cl.  
CPC ............... *B62D 55/30* (2013.01); *B62D 55/06* (2013.01); *B62D 55/18* (2013.01)

(58) Field of Classification Search  
CPC ........ B62D 55/06; B62D 55/08; B62D 55/18; B62D 55/30; B62D 55/305  
USPC ................. 305/145, 146, 147, 153, 155, 156  
See application file for complete search history.

(56) References Cited

U.S. PATENT DOCUMENTS

| | | | |
|---|---|---|---|
| 3,792,910 A | 2/1974 | Kaufman et al. | |
| 3,826,543 A | 7/1974 | Muller | |
| 3,829,172 A | 8/1974 | Oestmann et al. | |
| 3,841,715 A * | 10/1974 | Comer, Jr. ............. | B62D 55/30 305/146 |
| 3,980,351 A * | 9/1976 | Orr ........................ | B62D 55/30 305/146 |
| 4,650,259 A | 3/1987 | Alexander et al. | |
| 8,079,650 B2 | 12/2011 | Tokach et al. | |
| 8,528,671 B2 | 9/2013 | Beasley et al. | |
| 2005/0150699 A1* | 7/2005 | Mukaino .............. | B62D 55/305 180/9.52 |
| 2012/0103704 A1 | 5/2012 | Beasley et al. | |

FOREIGN PATENT DOCUMENTS

CN 201703450 U 1/2011

* cited by examiner

Primary Examiner — John Walters  
(74) Attorney, Agent, or Firm — Leydig, Voit & Mayer, Ltd.

(57) ABSTRACT

A recoil system for a track assembly having a track roller frame and an idler movable is provided. The recoil system includes a spring, a track adjust cylinder, an end plate and a track adjust piston received in the track adjust cylinder. The track adjust cylinder and the track adjust piston are movable in first and second directions in response to movement of the idler with movement of the track adjust cylinder in a second direction compressing the spring against the end plate. The track adjust cylinder is adapted to rotate with the first end of the spring relative to the track adjust piston as the spring compresses and extends in response to movement of the track adjust cylinder in the first and second directions and wherein the second end of the spring is fixed against rotation relative to the end plate.

20 Claims, 5 Drawing Sheets

TRACK RECOIL SYSTEM

TECHNICAL FIELD

This disclosure relates generally to track assemblies for machines and, more particularly, to a recoil system for a track assembly of a machine.

BACKGROUND

Track type machines are used in a variety of applications in, for example, the construction, mining, agricultural and forestry industries, Track type machines utilize one or more track assemblies that include an endless track that extends around a plurality of rolling elements. In order to better allow the tracks of the machine to interact with variable loads encountered when the machine is being maneuvered over the ground including, for example, rocks or logs, the track assemblies may be equipped with a recoil system. A typical track recoil system may include a forward idler that is supported by a track roller frame assembly about which the track is mounted. The idler may be connected to a yoke that may slide fore and aft with respect to the track roller frame assembly in order to react to various loads that are transmitted from the track to the idler. The yoke in turn acts upon a biasing member that is compressed when the idler and yoke are pushed rearward relative to the track roller frame assembly. The spring then pushes back on the yoke and idler to recoil both toward their undisturbed operating configuration.

One example of such a recoil system is disclosed in U.S. Pat. No. 8,079,650 ("the '650 patent"). A problem with recoil systems such as disclosed in the '650 patent is that they can involve metal-to-metal contact between moving parts that can make the systems subject to wear. Some of the wear can be alleviated by the use of a lubricant, which must be periodically applied to the moving parts.

SUMMARY

In one aspect, the disclosure describes a recoil system for a track assembly having a track roller frame and an idler movable relative to the track roller frame in opposing first and second directions. The recoil system includes a spring, a track adjust cylinder, an end plate and a track adjust piston received in the track adjust cylinder. The spring is arranged with a first end abutting against the track adjust cylinder and a second end abutting against the end plate. The track adjust cylinder and the track adjust piston are movable in the first and second directions in response to movement of the idler with movement of the track adjust cylinder in the second direction compressing the spring against the end plate. The track adjust cylinder is adapted to rotate with the first end of the spring relative to the track adjust piston as the spring compresses and extends in response to movement of the track adjust cylinder in the first and second directions and wherein the second end of the spring is fixed against rotation relative to the end plate.

In another aspect, the disclosure describes a track assembly for a track type machine. The track assembly includes a track roller frame and an idler rotatably supported by the track roller frame and being movable relative to the track roller frame in opposing first and second directions. A recoil system is operably positioned between the track roller frame and the idler and includes a spring, a track adjust cylinder and a track adjust piston. The track adjust cylinder and the track adjust piston are movable in the first and second directions in response to movement of the idler with movement of the track adjust cylinder in the second direction compressing the spring. A first end portion of the recoil system is supported relative to the track roller frame by a support portion of the track roller frame and a second end portion of the recoil system is supported by an end plate and wherein the support portion and the end plate are the only points of contact between movable components of the recoil system and the track roller frame.

In yet another aspect, the disclosure describes a track type machine including a track roller frame and an idler rotatably supported near a first end of the track roller frame and being movable relative to the track roller frame in opposing first and second directions. A track recoil system includes a spring, a track adjust cylinder, an end plate and a track adjust piston received in the track adjust cylinder. The spring is arranged with a first end abutting against the track adjust cylinder and a second end abutting against the end plate. The track adjust cylinder and the track adjust piston are movable in the first and second directions in response to movement of the idler with movement of the track adjust cylinder in the second direction compressing the spring against the end plate. The track adjust cylinder is adapted to rotate with the first end of the spring relative to the track adjust piston as the spring compresses and extends in response to movement of the track adjust cylinder in the first and second directions and wherein the second end of the spring is fixed against rotation relative to the end plate.

DETAILED DESCRIPTION

Figure 1:
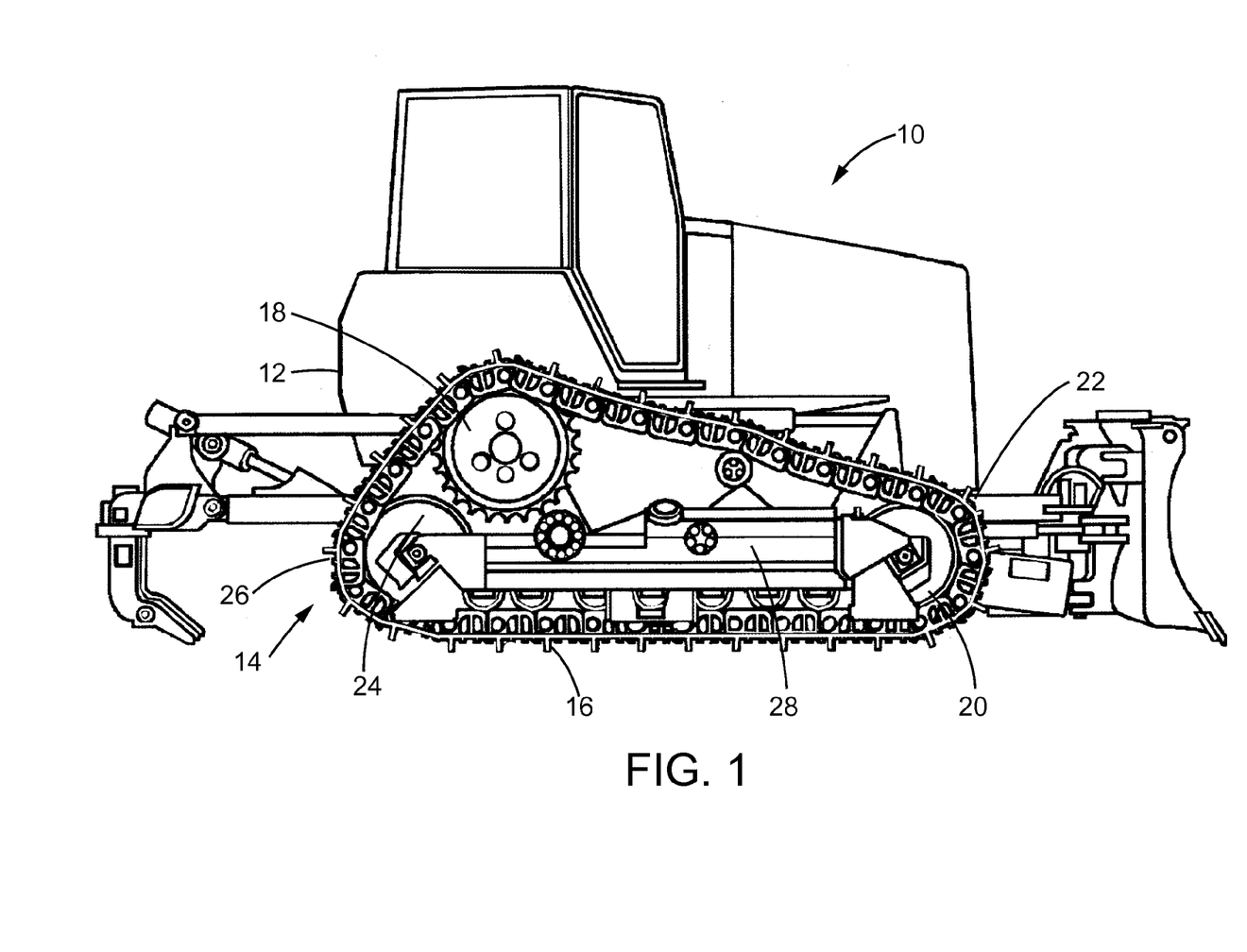
FIG. 1 is a side view of an exemplary track type machine according to the present disclosure.

This disclosure generally relates to a track assembly for a machine and, more particularly, to a recoil system for a track assembly. An exemplary embodiment of a machine 10 is shown in FIG. 1. The machine 10 may be a mobile machine that performs some type of operation associated with an industry such as mining, construction, farming, transportation, forestry or any other industry known in the art. For example, the machine 10 may be a track-type tractor, as depicted in FIG. 1, having a frame 12 and a track assembly 14 supported on the frame 12. The track assembly 14 may include a ground engaging track 16 that may propel the machine 10 over a surface. In the exemplary embodiment shown in FIG. 1, identical track assemblies 14 may be provided on each side of the machine 10 (only one side is visible in FIG. 1). Although the track type machine 10 is illustrated as a track type tractor, those skilled in the art will appreciate that the present disclosure is equally applicable to any track type machine.

Figure 2:
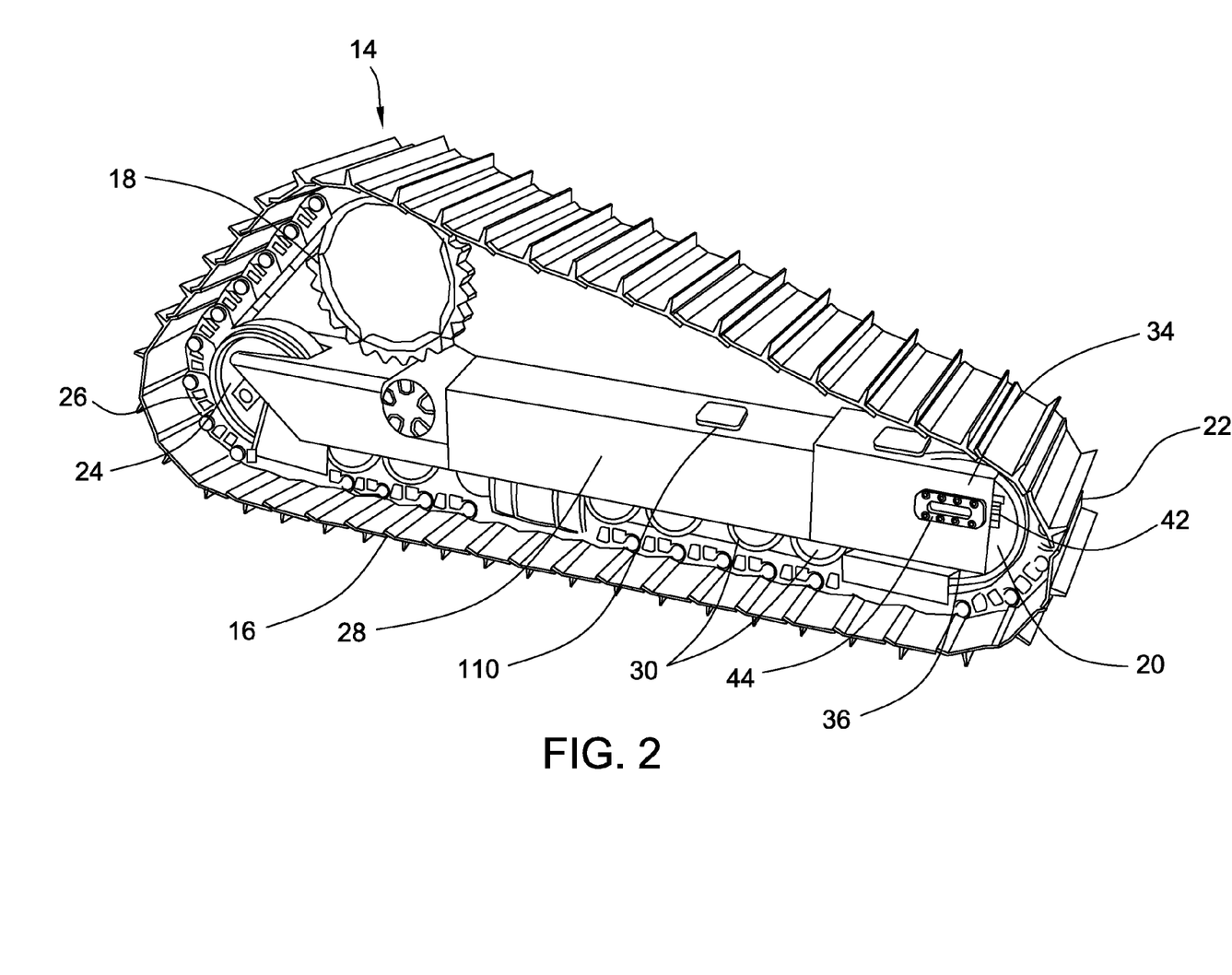
FIG. 2 is a partially cut away isometric view of a track assembly of the machine of FIG. 1.

As shown in FIG. 2, the track assembly 14 may further include a driven sprocket 18 that may be coupled to a power source by way of, for example, a drive train (not shown) and configured to engage and drive the ground engaging track 16. The track assembly 14 may include a front idler 20 arranged at a front end 22 of the track assembly 14. The front idler 20 may comprise a rolling element that passively rolls against and helps support the track 16. As shown in the illustrated embodiment, the track assembly 14 may also include a rear idler 24 arranged at a rear end 26 of the track assembly 14. The front and rear idlers 20, 24 may be supported by a track roller frame 28 upon which the ground engaging track 16 may be mounted. The track roller frame 28 may further include a number of smaller rollers 30 configured to support and guide the ground engaging track 16. While in the illustrated embodiment the driven sprocket 18 is arranged generally above the track roller frame 28 near the rear end 26 of the track assembly 14, those skilled in the art will appreciate that the driven sprocket 18 may be arranged in other locations in the track assembly 14. For example, according to some embodiments, the driven sprocket 18 may be provided at the rear end 26 of the track assembly 14 in place of the rear idler 24.

Figure 3:
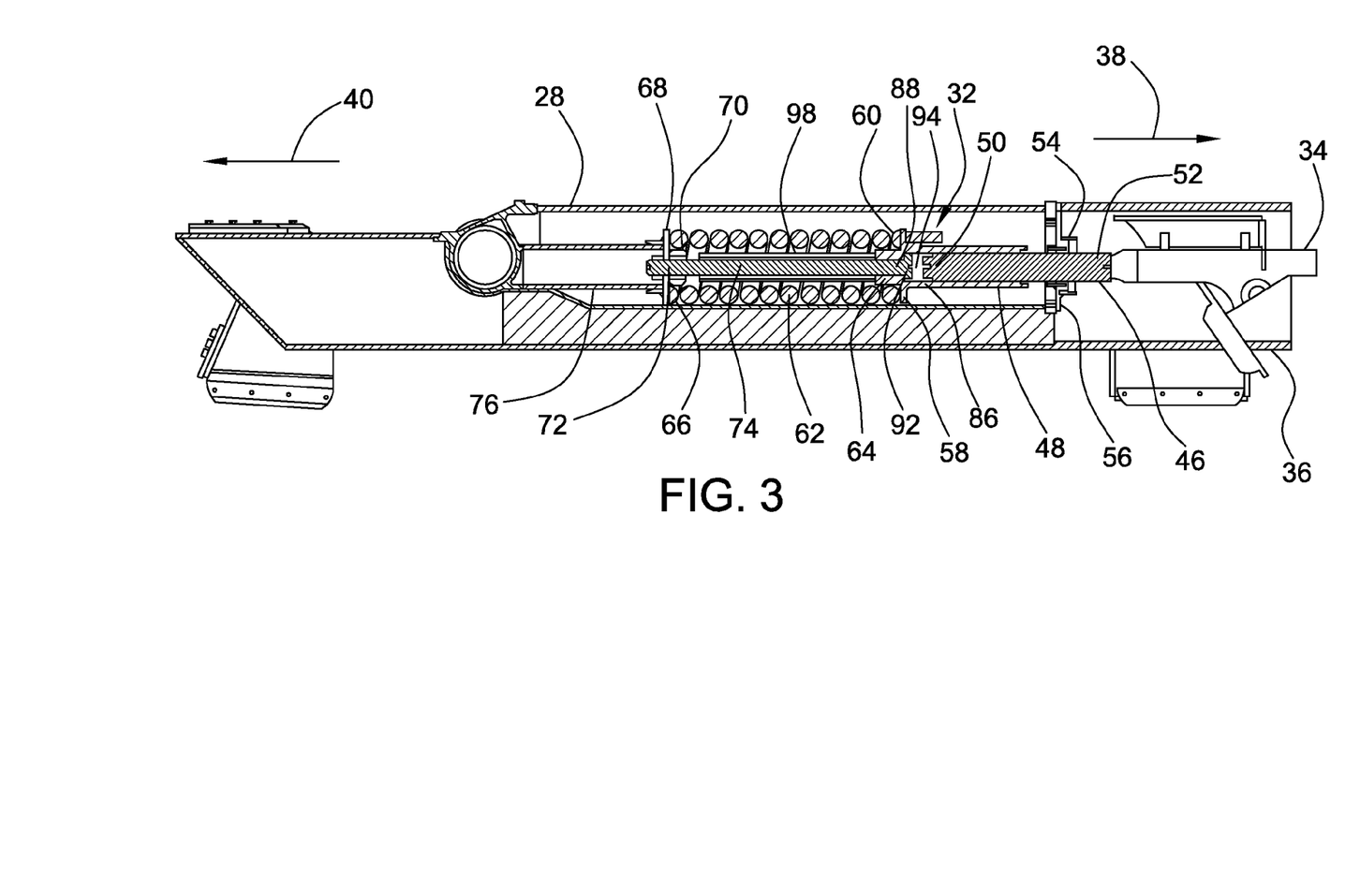
FIG. 3 is a side sectional view of a portion of a track roller frame of the track assembly of FIG. 2.
Figure 4:
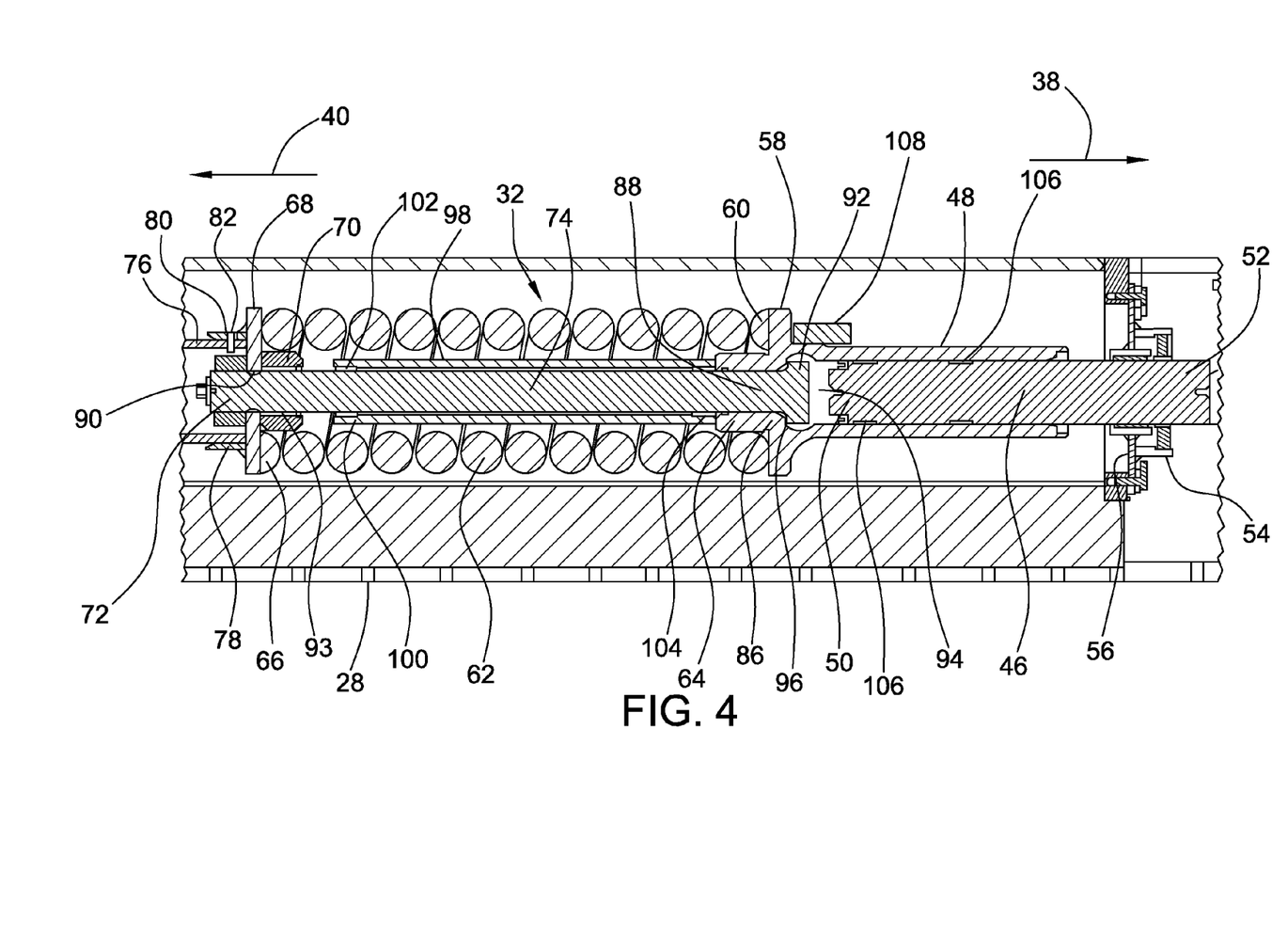
FIG. 4 is an enlarged side sectional view of a recoil system of the track roller frame of FIG. 3.

With reference to FIGS. 3 and 4, the track roller frame 28 may support a recoil system 32 that may be operably positioned between the front idler 20 and the track roller frame 28 so as to allow for relative movement of the front idler 20 relative to, in this case, the track roller frame 28, the rear idler 24 and the drive sprocket 18. More particularly, as shown in FIGS. 2 and 3, the recoil system 32 may include an idler support 34 at a front end 36 of the track roller frame 28 that is configured to rotatably support the front idler 20. For example, the idler support 34 may be configured as yoke. The idler support 34 may support the front idler 20 such that the front idler 20 may move in the forward direction 38 (i.e. toward the front end 22 of the track assembly 14) and the rearward direction 40 (i.e., toward the rear end 26 of the track assembly 14). For example, as shown in FIG. 2, the idler support 34 may include a keyway 42 in which a slide block 44 associated with the front idler 20 may slide in the forward and rearward directions 38, 40. Those skilled in the art will appreciate that the idler support 34 could have other configurations as well.

When the front idler 20 is pushed or driven in the rearward direction 40 such as when a load is applied to the track assembly 14, the idler support 34 may bear against a track adjust piston 46 of the recoil system 32. The track adjust piston 46 may be, at least partially, supported for longitudinal movement with respect to the track adjust piston 46 in the forward and rearward directions 38, 40 within a track adjust cylinder 48. More particularly, a rear portion 50 of the track adjust piston 46 may be arranged in the hollow interior of the track adjust cylinder 48 while a front portion 52 may be supported for movement in the forward and rearward directions 38, 40 by a connecting flange 54. The connecting flange 54 may connect, such as by bolts or other suitable fasteners, the recoil system 32 to a bulkhead 56 in the track roller frame 28 at a location rearward of the idler support 34. The connecting flange 54 may be configured to restrain movement of the track adjust piston 46 to the fore and aft directions.

Figure 5:
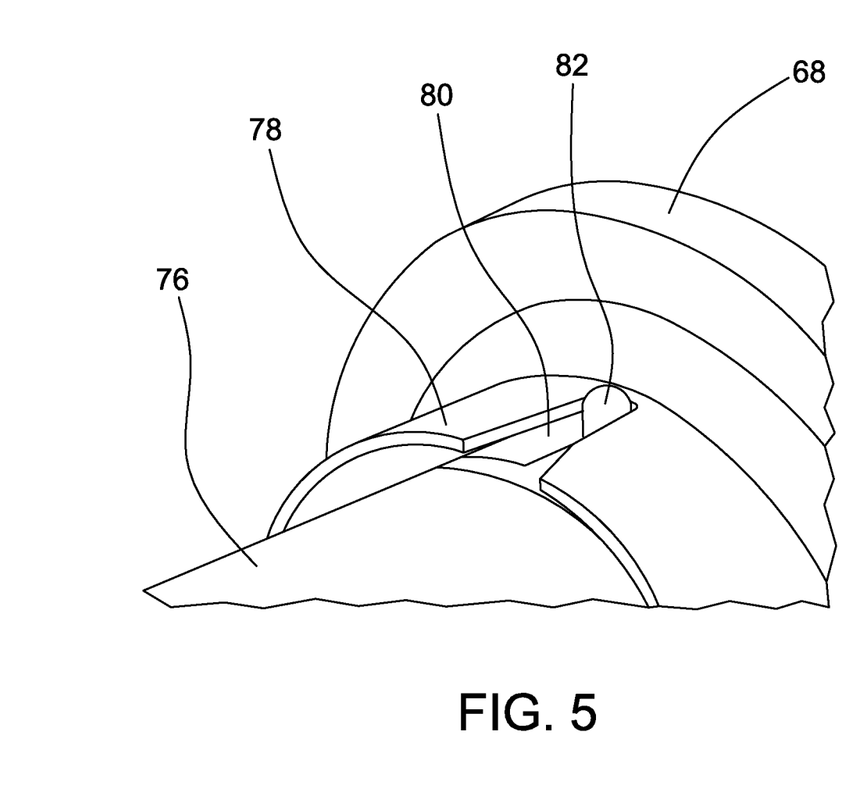
FIG. 5 is an enlarged isometric view of a portion of an end plate of the recoil system of FIG. 4.

With reference to FIG. 4, the track adjust cylinder 48 may support a spring plate 58 that bears against a forward end 60 of a spring 62. The spring plate 58 may be integrated with the track adjust cylinder 48 into a single component. The track adjust cylinder 48 may further include a neck portion 64 that extends in the rearward direction 40 from the spring plate 58 and is received in the interior of and supports the forward end 60 of the spring 62. The spring 62 may be a compression spring that is configured to produce a biasing force in the forward direction 38 when compressed. A rear end 66 of the spring 62 may bear against an end plate 68 and be supported by a support collar 70 that extends around a rear end 72 of a recoil rod 74. The end plate 68 may be secured to a tubular member 76 that, in turn, is fixedly connected to the track roller frame 28 (see FIG. 3). A neck 78 may also be connected to the end plate 68 and extend in the rearward direction 40 in surrounding relation to the tubular member 76. As shown in FIG. 5, this neck 78 may have a slot 80 or other opening therein that may receive a locking pin 82 that engages in a complementary opening in the tubular member 76. The locking pin 82 may fix the neck 78 and with it the end plate 68 against rotation relative to the tubular member 76 and the recoil rod 74. Thus, the end plate 68 may be adapted to be stationary in both the forward and rearward directions 38, 40 as well as fixed against rotation. Those skilled in the art will appreciate that other methods may be used to fix the end plate 68 against rotation and against movement in the forward and rearward directions 38, 40.

The rear end 72 of the recoil rod 74 may be supported in an opening 90 in the end plate 68 so as to allow movement of the recoil rod 74 in the forward and rearward directions 38, 40. The support collar 70 may extend in surrounding relation to the recoil rod 74 near the rear end 72 thereof. To facilitate sliding movement of the recoil rod 74 relative to the support collar 70, a bearing 93 may be interposed between the support collar 70 and the recoil rod 74 as shown in FIG. 4.

The length of the tubular member 76 may be varied depending on the length of the track assembly 14 for a particular machine. For example, a relatively shorter tubular member 76 may be used with relatively shorter track assemblies such as used with smaller machines while a relatively longer tubular member 76 may be used with the relatively longer track assemblies such as used with larger machines.

As shown in FIG. 4, the neck 78 and the spring plate 58 may be configured to support the spring 62 at the forward end 60 thereof and the support collar 70 and the end plate 68 may be configured to the support the rear end 66 of the spring 62 while the center portion of the spring 62 does not contact any other components of the recoil system 32 or the track roller frame 28. Additionally, the end plate 68 and the connecting flange 54 may support the recoil system 32 near either end thereof such that the center portion of the recoil system 32, including components thereof that move during operating of the recoil system such as the spring 62 and the track adjust cylinder 48, does not contact any other portion of the track roller frame 28.

A rear portion 86 of the track adjust cylinder 48 may be further configured to receive a forward end 88 of the recoil rod 74. The forward end 88 of the recoil rod 74 may have an enlarged head 92 that is larger than the interior passage in the track adjust cylinder 48 within which the recoil rod 74 is received. The track adjust piston 46, the track adjust cylinder 48 and the recoil rod 74 may be configured such that rearward movement of the track adjust piston 46 applies a force on the recoil rod 74 that moves the recoil rod 74 in the rearward direction 40.

In the illustrated embodiment, a chamber 94 is provided between the rear portion 50 of the track adjust piston 46 and the forward end 88 of the recoil rod 74. This chamber 94 may be filled, as discussed further below, by an incompressible fluid such as grease. With such a configuration, movement in the rearward direction 40 of the track adjust piston 46 may push through the incompressible fluid in the chamber 94 on the enlarged head 92 of the recoil rod 74. The enlarged head 92, in turn, may bear on a shoulder 96 in the interior of the track adjust cylinder 48 and thereby push the track adjust cylinder 48, and with it the spring plate 58, in the rearward direction 40 relative to the track roller frame 28. This rearward movement of the track adjust cylinder 48 and the spring plate 58 may bear on the spring 62 and compress it against the stationary end plate 68.

A stop tube 98 may extend in surrounding relation to the recoil rod 74 to limit rearward movement of the track adjust cylinder 48. More particularly, the stop tube 98 may extend in the rearward direction 40 from the rear portion 86 of the track adjust cylinder 48. The rear end 100 of the stop tube 98 may be spaced a distance from the support collar 70 when the spring 62 is in an uncompressed condition such as shown in FIG. 4. When, for example, a load is applied on the front idler 20 that causes the spring 62 to compress, the track adjust cylinder 48 pushes the stop tube 98 in the rearward direction 40. However, rearward travel of the stop tube 98 stops when it engages the collar 70 thereby stopping rearward movement of the track adjust cylinder 48 and further compression of the spring 62. Thus, the stop tube 98 may limit the travel of the front idler 20 in the rearward direction 40. The stop tube 98 may be supported near either end thereof on the recoil rod 74, such as by bearings. In the illustrated embodiment, as shown in FIG. 4, the stop tube 98 may be supported on the recoil rod 74 by a front bearing 104 and a rear bearing 102 that permit rotary movement of the stop tube 98 relative the recoil rod 74. Otherwise, however, the stop tube 98 does not contact the recoil rod 74. Additionally, the stop tube 98 may be configured and supported such that it extends through the interior of the spring 62 without coming into contact with the spring 62 as shown in FIG. 4.

As is known, the body of a spring rotates as it is compressed and extended. To accommodate such rotation, the rear end 66 of the spring 62 may bear against the stationary end plate 68 in such a manner that the rear end 66 of the spring 62 is fixed against rotation. In contrast, the track adjust cylinder 48 may be supported relative to the track roller frame 28 so as to be rotatable about the longitudinal axis of the track adjust cylinder relative to the track adjust piston 46. Thus, when the spring 62 compresses and rotates about its longitudinal axis, the force of the spring 62 on the spring plate 58 will rotate the track adjust cylinder 48 relative to the track adjust piston 46 which does not rotate. When the load on the front idler 20 is released, the spring 62 extends and rotates the track adjust cylinder 48 back to its original position relative to the track adjust piston 46 and the recoil rod 74. One or more wear bands 106 may be interposed between the track adjust piston 46 and the track adjust cylinder 48 to facilitate the rotary movement of the track adjust cylinder 48 relative to the track adjust piston 46. In the illustrated embodiment, two wear bands 106 are provided as shown in FIG. 4.

The recoil system 32 may be further configured such that the chamber 94 between the rear portion 50 of the track adjust piston 46 and the forward end 88 of the recoil rod 74 may be used to adjust the tension of the track 16. In particular, a valve assembly 108 may be provided on the track adjust cylinder 48 that may be used to fill the chamber 94 with a selected volume of grease, or other incompressible fluid, to adjust the effective distance between the recoil rod 74 and the idler support 34, thereby adjusting a forward position of the front idler 20, and consequently the tension in the track 16 that is mounted about the track roller frame 28. The valve assembly 108 may be configured to include various passageways to facilitate the addition or removal of grease from the chamber 94, as well as the ability to bleed gas from the chamber 94. For example, introducing additional grease into the chamber 94 may push the track adjust piston 46 in the forward direction 38 which will, in turn, move the idler support 34 in the forward direction 38. This may increase the tension on the track 16. As shown in the FIG. 2, the track roller frame 28 may include an access port 110 that may be used to access the valve assembly 108 on the track adjust cylinder 48. The ability of the track adjust cylinder 48 to rotate in opposite directions relative to the track adjust piston 46 as the spring 62 compresses and extends can ensure that the valve assembly 108 returns to a position aligned with the access port 110 when a load is removed from the front idler 20. For example, when a load is applied on the front idler 20 that causes the spring 62 to compress, the valve assembly 108 may rotate out of alignment with the access port 110. However, when the load is removed, the spring 62 will extend again and the track adjust cylinder 48 and the valve assembly 108 will rotate back into alignment with the access port 110.

INDUSTRIAL APPLICABILITY

The track assembly, and in particular the recoil system, of the present disclosure may be applicable to any track type machine, and especially those in need of a recoil capability. In addition, the present disclosure is applicable to those track machines that need some ability to adjust track tension, which may vary due to normal wear in the track, underlying rollers, idlers and sprockets. In particular, the recoil system may be operable to relieve tension on the track when rocks or other debris may become trapped between idlers or sprocket and track. When the tension on the track is relieved the recoil system may restore the track assembly back to a normal operating condition. Additionally, the recoil system may allow the tension on the track during normal operating conditions to be adjusted by adding or removing an incompressible fluid such as grease from a grease chamber provided in the recoil system.

Except for the grease provided in the grease chamber, the recoil system may otherwise be free of lubricant. In particular, the recoil system may be supported at either end such that the middle of the of the recoil system does not come into contact with the track roller frame. As there are no points of metal-to-metal contact other than the supports at either end of the recoil system, wear may be reduced and lubricant need not be provided. The spring, the stop tube and the recoil rod may also be supported relative to each other such that metal-to-metal contact is minimized. By eliminating the need to lubricate points of metal-to-metal contact, the recoil system of the present disclosure may need less maintenance as well as be less costly to maintain.

The support of the spring in which one end of the spring is fixed against rotation during compression and extension of the spring while the end of the spring bears against the track adjust cylinder and rotates along with the track adjust cylinder also helps reduce the amount of metal-to-metal contact and the need for lubrication. Additionally, the rotation of the track adjust cylinder helps ensure that the valve assembly is aligned with the access port when the spring is uncompressed. This may ease access to the valve assembly during maintenance operations.

It will be appreciated that the foregoing description provides examples of the disclosed system and technique. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

I claim:

1. A recoil system for a track assembly having a track roller frame and an idler movable relative to the track roller frame in opposing first and second directions, the recoil system comprising:
a spring;
a track adjust cylinder;
an end plate; and
a track adjust piston received in the track adjust cylinder, the spring being arranged with a first end abutting against the track adjust cylinder and a second end abutting against the end plate, the track adjust cylinder and the track adjust piston being movable in the first and second directions in response to movement of the idler with movement of the track adjust cylinder in the second direction compressing the spring against the end plate;
wherein the track adjust cylinder is adapted to rotate with the first end of the spring relative to the track adjust piston as the spring compresses and extends in response to movement of the track adjust cylinder in the first and second directions and wherein the second end of the spring is fixed against rotation relative to the end plate.

2. The recoil system of claim 1 wherein the first end of the spring abuts against a spring plate that is integrally connected with the track adjust cylinder.

3. The recoil system of claim 1 wherein a first end of the recoil system is supported relative to the track roller frame by a portion of the track adjust piston being received in a bulkhead of the track roller frame and a second of the recoil system is supported by the end plate being rigidly supported relative to the track roller frame and wherein the bulkhead and the end plate are the only points of contact between the recoil system and the track roller frame.

4. The recoil system of claim 1 further including a recoil rod a first portion of which is received in the track adjust cylinder and wherein the recoil rod is adapted to move in the first and second directions in response to movement of the idler.

5. The recoil system of claim 4 wherein a chamber is defined in the track adjust cylinder between an end of the recoil rod and an end of the track adjust piston, the chamber being filled with an incompressible fluid.

6. The recoil system of claim 5 further including a valve assembly on the track adjust cylinder configured to communicate with the chamber.

7. The recoil system of claim 6 further including an access port on the track roller frame that is aligned with the valve assembly when the spring is uncompressed.

8. The recoil system of claim 4 further including a stop tube arranged in surrounding relation to the recoil rod and wherein a second portion of the recoil rod and the stop tube extend through the spring.

9. The recoils system of claim 8 wherein the stop tube is supported on the recoil rod on bearings which are the only points of contact between the recoil rod and the stop tube and wherein the stop tube does not contact the spring.

10. The recoil system of claim 1 wherein the only points of contacts between the track adjust cylinder and the track adjust piston are a plurality of wear bands interposed between the track adjust cylinder the track adjust piston.

11. A track assembly for a track type machine, the track assembly comprising:
a track roller frame;
an idler rotatably supported by the track roller frame and being movable relative to the track roller frame in opposing first and second directions;
a recoil system operably positioned between the track roller frame and the idler and including a spring, a track adjust cylinder and a track adjust piston, the track adjust cylinder and the track adjust piston being movable in the first and second directions in response to movement of the idler with movement of the track adjust cylinder in the second direction compressing the spring;
wherein a first end portion of the recoil system is supported relative to the track roller frame by a support portion of the track roller frame and a second end portion of the recoil system is supported by an end plate and wherein the support portion and the end plate are the only points of contact between movable components of the recoil system and the track roller frame.

12. The track assembly of claim 11 where the track adjust piston is received in the track adjust cylinder and the spring has a first end abutting against the track adjust cylinder and a second end abutting against the end plate, the track adjust cylinder and the track adjust piston being movable in the first and second directions in response to movement of the idler and further including a recoil rod a first portion of which is received in the track adjust cylinder and wherein the recoil rod is adapted to move in the first and second directions in response to movement of the idler.

13. The track assembly of claim 12 wherein a chamber is defined in the track adjust cylinder between an end of the recoil rod and an end of the track adjust piston, the chamber being filled with an incompressible fluid.

14. The track assembly of claim 13 further including a valve assembly on the track adjust cylinder configured to communicate with the chamber.

15. The track assembly of claim 14 further including an access port on the track roller frame for providing access to the valve assembly.

16. The track assembly of claim 12 further including a stop tube for limiting movement of the track adjust cylinder in the second direction, the stop tube being arranged in surrounding relation to the recoil rod and wherein a second portion of the recoil rod and the stop tube extend through the spring.

17. The track assembly of claim 16 wherein the stop tube is supported on the recoil rod on bearings which are the only points of contact between the recoil rod and the stop tube and wherein the stop tube does not contact the spring.

18. A track type machine comprising:
a track roller frame;
an idler rotatably supported near a first end of the track roller frame and being movable relative to the track roller frame in opposing first and second directions; and
a track recoil system comprising:
a spring;
a track adjust cylinder;
an end plate; and
a track adjust piston received in the track adjust cylinder, the spring being arranged with a first end abutting against the track adjust cylinder and a second end abutting against the end plate, the track adjust cylinder and the track adjust piston being movable in the first and second directions in response to movement of the idler with movement of the track adjust cylinder in the second direction compressing the spring against the end plate;
wherein the track adjust cylinder is adapted to rotate with the first end of the spring relative to the track adjust piston as the spring compresses and extends in response to movement of the track adjust cylinder in the first and second directions and wherein the second end of the spring is fixed against rotation relative to the end plate.

19. The track type machine of claim 18 wherein a first end of the recoil system is supported relative to the track roller frame by a portion of the track adjust piston being received in a bulkhead of the track roller frame and a second of the recoil system is supported by the end plate being rigidly supported relative to the track roller frame and wherein the bulkhead and the end plate are the only points of contact between the recoil system and the track roller frame.

20. The track type machine of claim 19 further including a recoil rod a first portion of which is received in the track adjust cylinder and wherein the recoil rod is adapted to move in the first and second directions in response to movement of the idler and wherein a chamber is defined in the track adjust cylinder between an end of the recoil rod and an end of the track adjust piston, the chamber being filled with an incompressible fluid.

* * * * *